July 8, 1952   K. H. HILL   2,602,259
ANIMAL TRAP
Filed Aug. 11, 1947
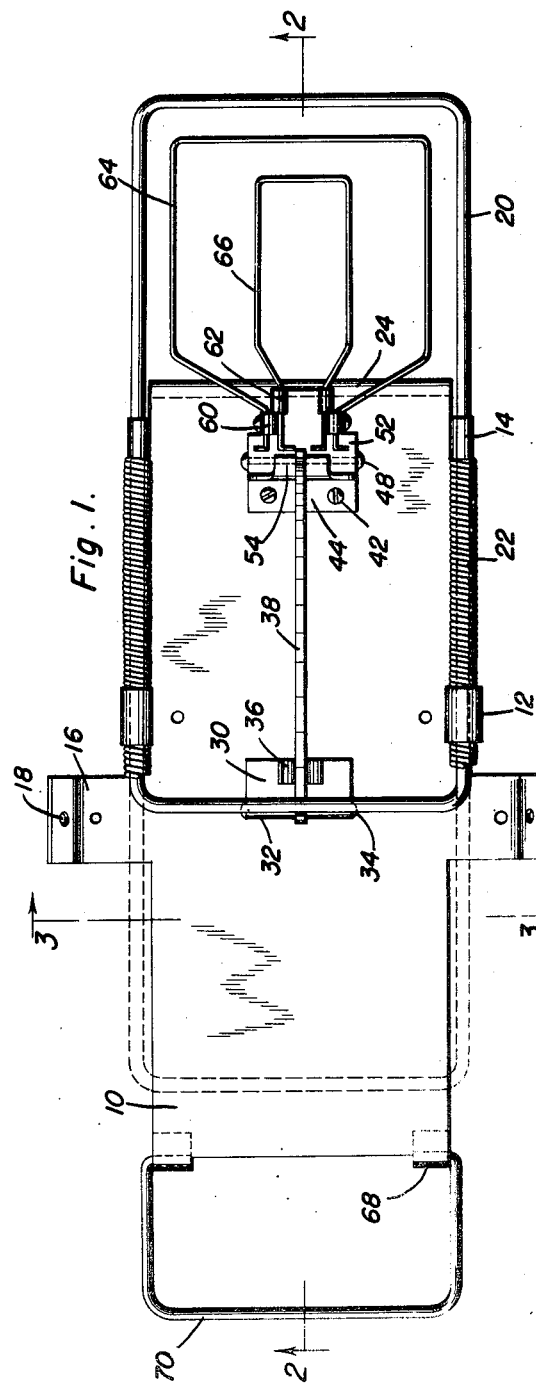
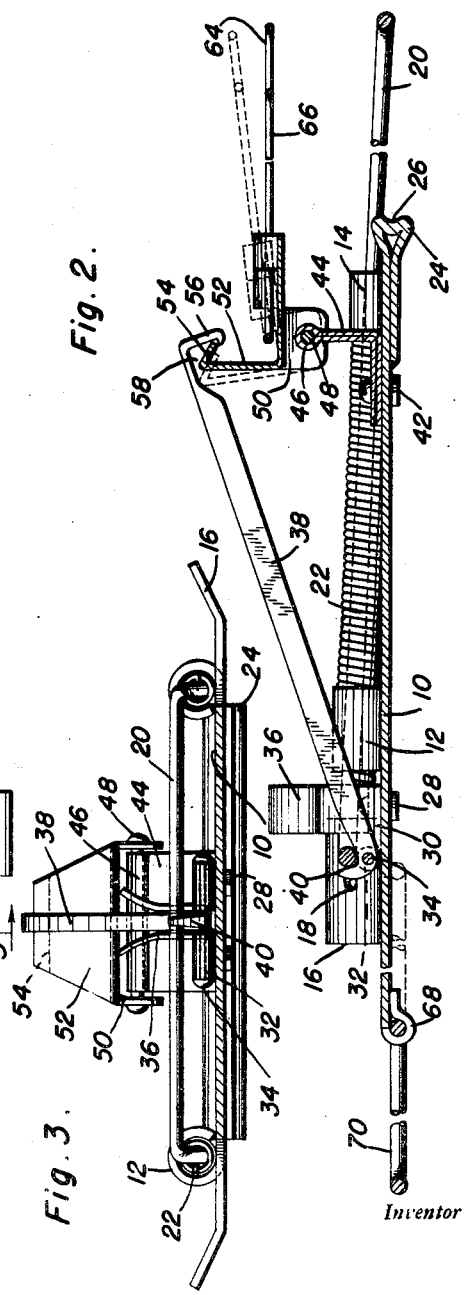
Inventor
Kearney H. Hill
By
Clarence A. O'Brien
and Harvey B. Jackson
Attorneys Patented July 8, 1952

2,602,259

UNITED STATES PATENT OFFICE 2,602,259

ANIMAL TRAP

Kearney H. Hill, Pawnee, Okla.

Application August 11, 1947, Serial No. 767,888

1 Claim. (Cl. 43—78)

This invention relates to new and useful improvements in animal traps and the primary object of the present invention is to provide a slidable member including novel and improved means for actuating the same against a base plate for garroting or breaking an animal's neck that engages the device.

Another important object of the present invention is to provide an animal trap so designed as to be used without the necessity of applied bait.

A further object of the present invention is to provide a trap that is quickly and readily applied to a supporting surface in the path of an animal or adjacent an opening in which the animal is hidden so that as the animal extends its head out of the opening the trap will be actuated to instantly kill the animal.

A still further aim of the present invention is to provide an animal trap that is simple and practical in construction, strong and reliable in use, relatively inexpensive to manufacture, and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the present invention in position for use, and with dotted lines showing the position of the yoke member when actuated;

Figure 2 is a longitudinal vertical sectional view taken substantially on the plane of section line 2—2 of Figure 1, and with dotted lines showing the manner in which the yoke member is actuated; and, Figure 3 is a transverse vertical sectional view taken substantially on the plane of section line 3—3 of Figure 1.

Referring now to the drawings in detail, wherein for the purpose of illustration, there is disclosed a preferred embodiment of the present invention, the numeral 10 represents a base member substantially rectangular in form having outwardly projecting integral extensions at each side thereof that are bent inwardly to provide spaced guard members or sleeves 12 and 14.

Also projecting outwardly from the side of the plate, are integral angular extensions 16 provided with apertures 18 that suitably engage suitable fastening means (not shown) for attaching the base member to a supporting surface such as a wall, floor, ground or the like.

Slidably mounted in guide members 12 and 14 is a substantially rectangular frame or yoke 20 preferably circular in cross section. Embracing the longitudinal sides of the yoke 20 are coil springs 22 that extend through guide members 12.

One end of the base member 10 is folded inwardly and secured to itself by welding or any other suitable means, and the free extremities of this end of the plate are forced inwardly to provide a transverse stop member 24 having a transverse groove 26 that engages the forward end of the yoke 20, when the device is not in use or when the same has been actuated.

Removably secured to the base member 10 by fasteners or the like 28, is a pair of spaced substantially rectangular plates 30 having one of their edges bent upwardly to provide a pair of transversely spaced sleeves 32 that support a pin 34 having its ends flattened to retain the same in position within the sleeves 32. Projecting upwardly from the opposite edges of the plates 30 is a pair of spaced parallel arms or guides 36 having their outer ends turned outwardly away from each other.

Pivotally mounted on pin 34 and between sleeves 32, is a lever 38 having a lip or hook 40 at one end that engages the inner transverse end of the yoke 20 when the yoke is pulled forwardly in a set position for use.

Removably secured to the forward portion of the base plate by fasteners or the like 42, is an angular member 44 provided with a transverse sleeve 46 at its outer end in which is journaled a transverse pin 48. The outer ends of pin 48 extend outwardly from the sleeve 46 and pivotally receive the downturned ears 50 of an angular plate 52. The reduced end of this plate 52 is turned inwardly at an inclined angle to provide a hook 54 that engages a hook 56 at the forward free end of the lever 38. Adjacent the hook 56 the lever is provided with a notch 58 facilitating convenient engagement of hook 54 with the hook 56.

The side edges of plate 52 are turned inwardly to provide pairs of sleeves 60 and 62 that respectively engage the ends of an outer frame 64 and an inner frame 66. The terminals of the outer frame are turned outwardly to prevent disengagement of the sleeve 60 and the terminals of the inner frame are turned inwardly toward each other to prevent disengagement of the inner frame with sleeve 62. At the rear edge of the base plate 10 there are provided integral plates that are bent inwardly upon themselves to form sleeves 68 that pivotally engage the inturned end of a substantially U-shaped handle 70.

In practical use of the device, the handle 70 is gripped by one hand and the yoke 20 pulled forwardly by the other hand so that hook 56 engages hook 54 and the springs 22 are biased between sleeve 14 and the rear end of the yoke. The trap is then placed over an opening made by an animal such as a rat hole, fox hole or the like. The base plate may be secured to a suitable supporting surface by merely inserting nails or the like into apertures 18.

When the animal extends its head out of the opening covered by frames 64 and 66 and contacts either or both of the frames, the plate 52 is pivoted so that hook 54 disengages hook 56, whereby the rear end of the yoke is forced by the spring 22 against hook 40 to pivot the lever 38 outwardly and the forward end of the yoke moves toward the stop 24 with great force to break the neck of the animal between the stop and the forward end of the yoke.

In view of the foregoing description taken in conjunction with the accompanying drawings it is believed that a clear understanding of the construction, operation and advantages of the device will be quite apparent to those skilled in this art.

It is to be understood, however, that even though there is herein shown and described a preferred embodiment of the invention the same is susceptible to certain changes fully comprehended by the spirit of the invention as herein described and the scope of the appended claim.

Having described the invention, what is claimed as new is:

An animal trap comprising a base member having an abutment at one end, a substantially rectangular and open frame member slidably mounted on said base member and having a portion adapted to cooperate with said abutment to garrote an animal disposed between said abutment and said portion, means normally urging said portion toward said abutment, a pivotal lever mounted on said base member and having first and second terminal hooks, said first terminal hook engaging one end of said frame member to retain the latter in cocked position with the portion spaced from the abutment, a swingable trigger carried by said base member and engaging the second terminal hook of said lever when said frame member is in cocked position, a contact frame carried by said trigger and disposed above said frame member for actuating said trigger, a pair of plates secured to said base member, sleeves carried by said plates, said first terminal hook being disposed between the sleeves, a pivot pin carried by the sleeves and extending through the first terminal hook, and a pair of guide arms projecting laterally from the plates and slidably receiving the end of the lever adjacent the first terminal hook therebetween.

KEARNEY H. HILL.

REFERENCES CITED

The following references are of record in the file of this patent:

UNITED STATES PATENTS

| Number | Name | Date |
|---|---|---|
| 355,857 | Boynton | Jan. 11, 1887 |
| 898,262 | Renken | Sept. 8, 1908 |
| 1,027,974 | Barker | May 28, 1912 |
| 1,160,872 | Fox | Nov. 16, 1915 |
| 1,315,510 | Juricek | Sept. 9, 1919 |
| 2,006,111 | Potigian | June 25, 1935 |
| 2,260,872 | Schmidt | Oct. 28, 1941 |